United States Patent
Koga et al.

Patent Number: 6,073,908
Date of Patent: Jun. 13, 2000

[54] SOLENOID VALVE

[75] Inventors: Yojiro Koga; Kazuo Miyazato, both of Kariya, Japan

[73] Assignee: Aisen Seiki Kabushiki Kaisha, Aichi-ken, Japan

[21] Appl. No.: 09/130,170

[22] Filed: Aug. 6, 1998

[30] Foreign Application Priority Data

Aug. 6, 1997 [JP] Japan ................................. 9-212255

[51] Int. Cl.$^7$ .................................................. F16K 31/06
[52] U.S. Cl. ................ 251/129.15; 251/337; 251/129.17
[58] Field of Search ........................ 251/129.07, 129.15, 251/129.17, 337

[56] References Cited

U.S. PATENT DOCUMENTS

| | | | |
|---|---|---|---|
| 4,609,012 | 9/1986 | Shelton | 251/337 X |
| 4,930,747 | 6/1990 | Nakamura | 251/129.17 |
| 5,056,556 | 10/1991 | Nishimoto et al. | 251/129.15 X |
| 5,188,073 | 2/1993 | Ejiri et al. | 251/129.15 X |
| 5,617,894 | 4/1997 | Wolff | 251/337 X |
| 5,720,469 | 2/1998 | Miyazato et al. | 251/129.15 X |

FOREIGN PATENT DOCUMENTS 62-113977  5/1987  Japan .

*Primary Examiner*—John Rivell
*Assistant Examiner*—Meredith H. Schoenfeld
*Attorney, Agent, or Firm*—Reed Smith Hazel & Thomas LLP

[57] ABSTRACT

A solenoid valve incorporates a housing having an electric coil and a magnetic core built therein; a valve seat formed in the inside of the housing; a moving iron core adapted to be actuated by the electric coil and the magnetic core and having a valve member for opening/closing the valve seat; and a leaf spring fixed in the inside of the housing and adapted to warp at all times when the moving iron core acts. A flanged portion extends from the moving iron core in a direction perpendicular to the acting direction of the moving iron core and outward of the same. The flanged portion is provided with one face for causing the leaf spring to abut against the face of the moving iron core in the acting direction when the electric coil is energized.

3 Claims, 2 Drawing Sheets

SOLENOID VALVE

BACKGROUND OF THE INVENTION

1. Field of the Invention

The present invention relates to a solenoid valve for ensuring the opening/closing actions of a valve member.

2. Description of Related Art

The solenoid valve of this kind known per se has been disclosed in Unexamined Published Japanese Patent Application No. 62-113977. This solenoid valve is constructed to include: a housing having an electric coil and a magnetic core built therein; a valve seat formed in the inside of the housing; a moving iron core adapted to be actuated by the electric coil and the magnetic core and having a valve member for opening/closing the valve seat; and a leaf spring fixed in the inside of the housing and adapted to warp at all times when the moving iron core acts.

The valve member is made of an elastic material because it hits the valve seat, causing reverberations when opening or closing relative to the valve seat. The valve member is baked and fixed on one face of the moving iron core, and the leaf spring is inserted and fixed at its inner circumference in the outer circumference of the valve member.

The leaf spring is fixed at a predetermined position in the outer circumference of the valve member so that it urges the outer circumference of the valve member by a predetermined stroke in a direction opposite to the acting direction of the moving iron core to thereby eliminate the axial deflection of the moving iron core in the acting direction. Moreover, the leaf spring is fixed in the housing through a lip and in the outer circumference of the valve member to thereby regulate the axial turn in the acting direction of the moving iron core. As a result, when the valve member is opened/closed to come into abutment against the valve seat, the noise, as might otherwise be caused by the deviation of the abutment position of the valve member against the valve seat due to the axial deflection in the acting direction of the moving iron core, can be eliminated to reduce the wear of the valve seat or valve member, as might otherwise be caused by the axial turning in the acting direction of the moving iron core.

If the actions of the solenoid valve, as effected in the device of the prior art by linear control, are performed many times for a short time period, however, the leaf spring is warped by the actions of the moving iron core causing wear in the valve member at the portion in which the inner circumference of the leaf spring and the outer circumference of the valve member made of the elastic material are fixed. In addition, the leaf spring and the valve member may come out of their fixed state.

Since the valve member fixes the leaf spring at its outer circumference, moreover, it is urged in the direction opposite to the acting direction of the moving iron core. As a result, two forces in the opposite directions are established applying a load to the fixed portions of the valve member, as urged in the direction opposed to the acting direction of the moving iron core, and the activated moving iron core. This may cause separation of the baked portions of the valve member and the moving iron core.

SUMMARY OF THE INVENTION

In order to solve the above-specified technical problems, according to the technical means of the invention, there is provided a solenoid valve comprising: a housing having an electric coil and a magnetic core built therein; a valve seat formed in the inside of the housing; a moving iron core adapted to be actuated by the electric coil and the magnetic core and having a valve member for opening/closing the valve seat; and a leaf spring fixed in the inside of the housing and adapted to warp at all times when the moving iron core acts, wherein the improvement comprises a flanged portion extended from the moving iron core in a direction perpendicular to the acting direction of the moving iron core and outward of the same and having one face for causing the leaf spring to abut against the face of the moving iron core in the acting direction when the electric coil is energized.

According to this technical means, the flanged portion extended outward of the moving iron core and the leaf spring are adapted to abut on the face of the flanged portion in the acting direction so that the no wear is caused in the abutting portions by the action of the moving iron core. As a result, the leaf spring and the flanged portions of the moving iron core will not come out of engagement, and the leaf spring abuts against the flanged portion and warps at all times when the moving iron core acts.

Moreover, it is preferable that the leaf spring and the flanged portion are fixed by the valve member. According to this technical means, the axial turn of the moving iron core is regulated by the leaf spring to cause none of the wear which might otherwise occur when the valve member turns to hit the valve seat.

Still moreover, it is also preferable that the flanged portion is formed in the vicinity of the valve member, that the leaf spring has holes, and that the valve member is made of an elastic member which is inserted into the holes to cover the flanged portion to thereby fix the leaf spring and the flanged portion. According to this technical means, the leaf spring and the moving iron core can be easily fixed by molding the valve member. The valve member is partially inserted into the holes of the leaf spring so that the axial turn of the moving iron core can be more regulated to eliminate the wear which might otherwise occur when the valve member turns into abutment against the valve seat.

DESCRIPTION OF THE PREFERRED EMBODIMENT

Figure 1:
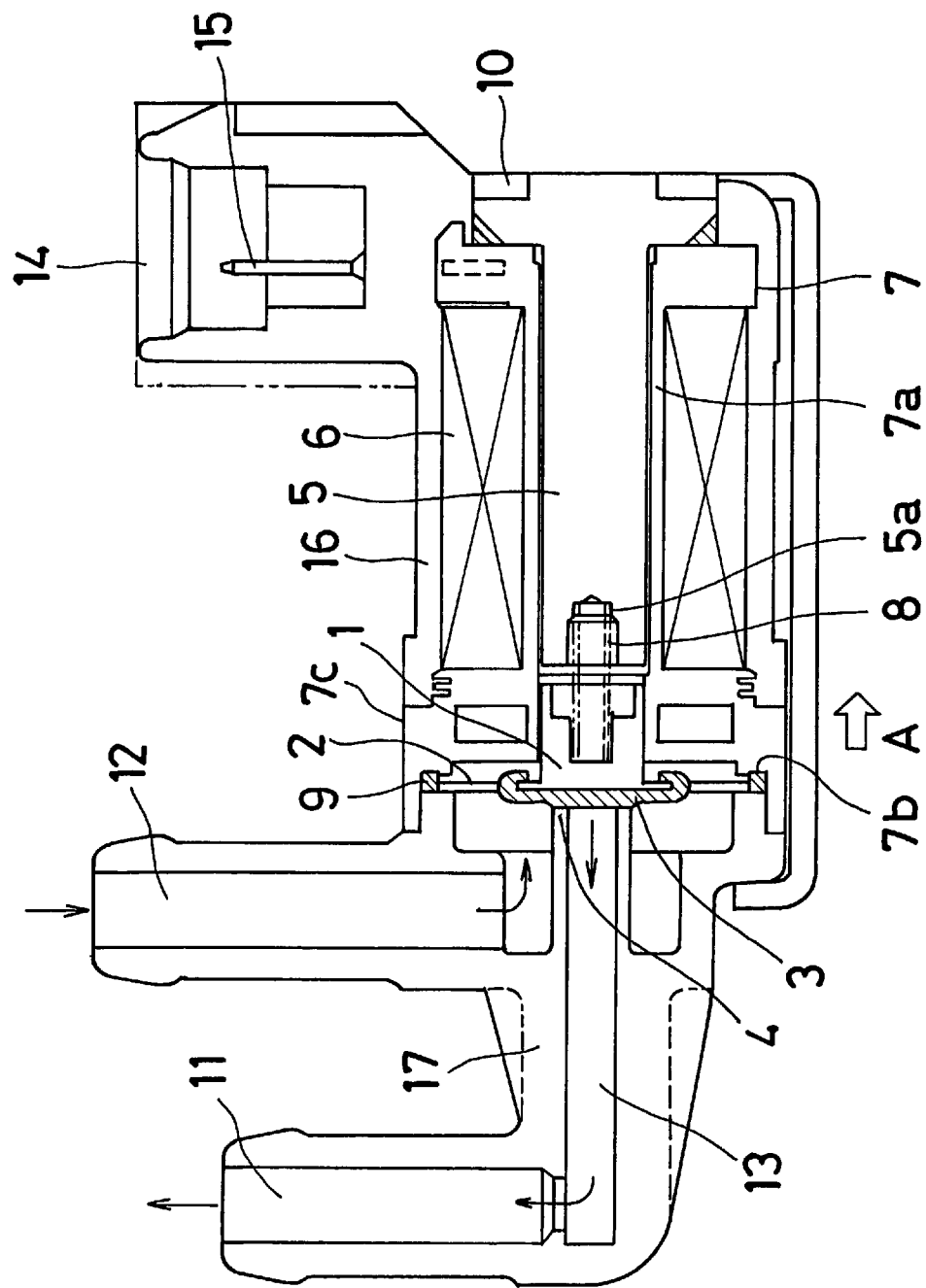
FIG. 1 is a sectional view showing a solenoid valve according to the invention.
Figure 2:
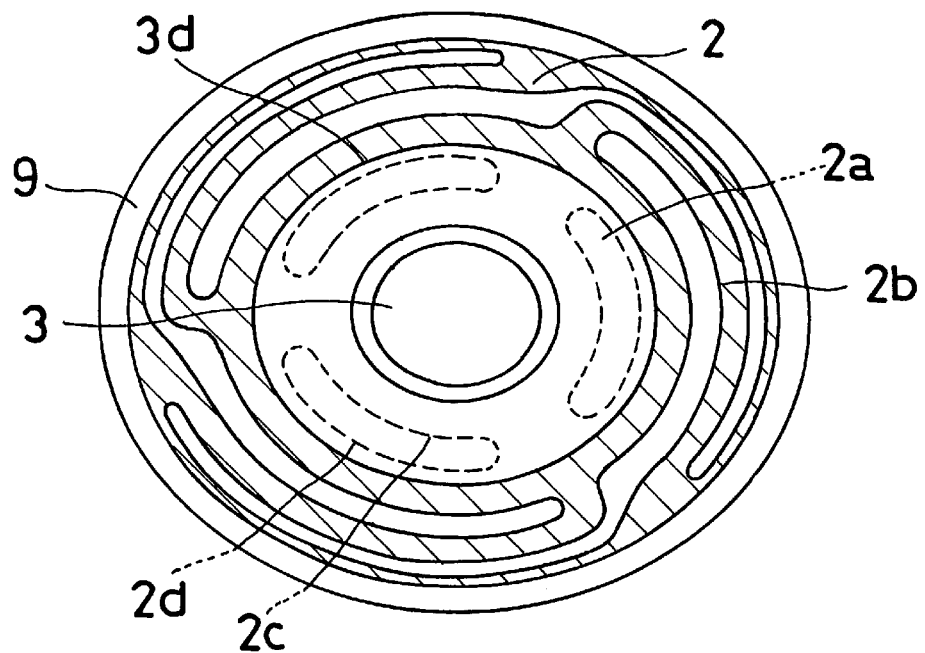
FIG. 2 is a front elevation showing a moving iron core of the solenoid valve according to the invention.
Figure 3:
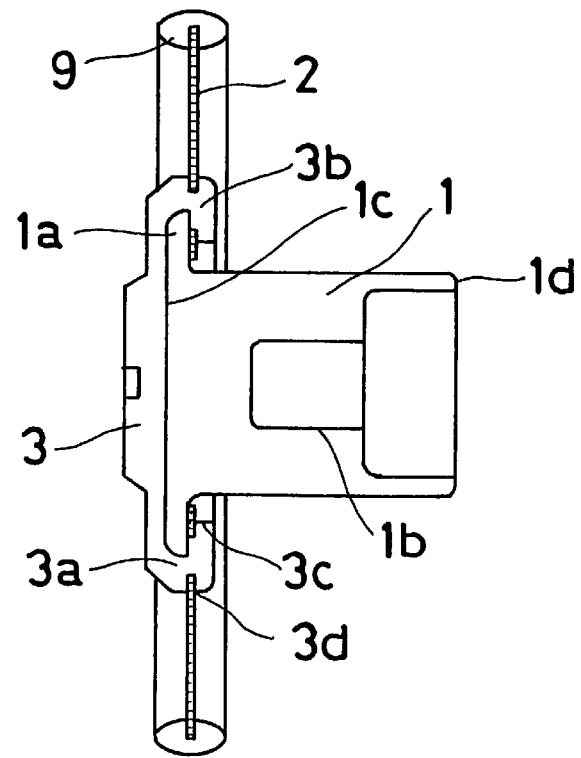
FIG. 3 is a sectional view showing the moving iron core of the solenoid valve according to the invention.

An embodiment of the invention will be described with reference to the accompanying drawings. FIG. 1 is a sectional view of a solenoid valve; FIG. 2 is a front elevation of a moving iron core of the solenoid valve; and FIG. 3 is a section of the moving iron core of the solenoid valve.

As shown in FIG. 1, a first body 16 is made of a non-magnetic material and has a stationary iron core 5, an electric coil 6, a bobbin 7 and a spring 8 built therein. On the other hand, the first body 16 forms a socket 14, into which there are inserted a terminal 15 electrically connected with the electric coil 6 and the other terminal (although not shown). This electric coil 6 is wound on the bobbin 7. This bobbin 7 is made of a non-magnetic material and has a bore 7a fitting the stationary iron core 5 therein. This stationary iron core 5 has a hole 5a, into which there is inserted the spring 8 for urging a later-described moving iron core 1 away from the stationary iron core 5 at all times, and is fixed in the first body 16 by a yoke 10. When the electric power is supplied from the other terminal through the terminal 15 to the electric coil 6, a magnetic power acts upon the stationary iron core 5 so that the moving iron core 1 is attracted by the stationary iron core 5 to act in a direction, as indicated by letter A in FIG. 1.

A second body 17 is made of a non-magnetic material and is equipped therein with: ports 11 and 12; a passage 13 connected to the port 11 near its one end and provided with a valve seat 4 at its other end; and the valve seat 4 to be opened/closed by a later-described valve member 3.

Between the first body 16 and the second body 17, as shown in FIG. 1, there is arranged an end portion 7c of the bobbin 7. Thus, in this embodiment, the housing is composed of the first body 16, the second body 17 and the bobbin 7.

In the end portion 7c of the bobbin 7, there are arranged a leaf spring 2 and the moving iron core 1. In the leaf spring 2, there are formed arcuate holes 2a and generally arcuate openings 2b as shown in FIG. 2 and FIG. 3. These openings 2b are formed in plurality at an angularly equal spacing on the center of the leaf spring 2 thereby to enable the leaf spring 2 to warp in the direction A. On the outer circumference of the leaf spring 2, there is fixedly baked a lip 9. The leaf spring 2 having the lip 9 fixed thereon is fitted in a groove 7b, which is formed in the bobbin 7, so that it is fixed in the housing by clamping it between the second body 17 and the bobbin 7. Moreover, the leaf spring 2 may be so fixed in the housing as to warp at all times when the moving iron core acts. In case the bobbin 7 is buried in the first body 16, the housing is composed of the first body 16 and the second body 17. Then, the leaf spring may be fixed at such a proper position in the first body 16 or the second body 17 as to warp at all times when the moving iron core acts. In this embodiment, the leaf spring 2 has a 0 variation when the later-described valve member 3 is in abutment against the valve seat 4.

In FIG. 3, the moving iron core 1 has: an end face 1d formed on the side of the direction A of the moving iron core 1; an end face 1c formed on the side opposed to the end face 1d; the valve member 3 fixed on the end face 1c by adhesion means; a flanged portion 1a extended from the end face 1c; and a hole 1b for inserting the spring 8. In this embodiment, the flanged portion 1a is formed by extending the end face 1c and is urged by the leaf spring 2 when the moving iron core 1 acts, so that it may be formed perpendicular to the acting direction of the moving iron core 1 and outward of the moving iron core 1. It is further preferable for the arranged relation to the later-described leaf spring 2 that the flanged portion 1a is formed in the vicinity of the valve member 3. The valve member 3 is brought, when the electric coil 6 is deenergized, into abutment against the valve seat 4 to keep the passage closed, by the action of the spring 8 which is inserted into the hole 1b.

The leaf spring 2 and the moving iron core 1 are so arranged that the leaf spring 2 abuts against the flanged portion 1a of the moving iron core 1 on the side of the direction A as shown in FIGS. 2 and 3. The valve member 3 is formed by the compression molding method so that the moving iron core 1 and the leaf spring 2, as disposed in the mold, can be easily fixed by allowing the valve member 3 partially to flow from the side of the direction A to the back side of the leaf spring 2 through the arcuate holes 2a which are formed to have a larger diameter than that of the flanged portion 1a of the moving iron core 1. As a result, the valve member 3 covers the face extended from the end face 1c of the flanged portion 1a and is formed of: insert portions 3a which are inserted into the holes 2a formed in the leaf spring 2; and an engagement portion 3b which has a smaller internal diameter 3c than 2c of the arcuate holes 2a and a larger external diameter 3d than 2d of the arcuate holes 2a to thereby engage with the side of the leaf spring 2 in the direction A.

Herein below will be described the operation of the present invention:

When the electric power is supplied from the other terminal through the terminal 15 to the electric coil 6, the magnetic force is generated in the stationary iron core 5. This magnetic force overcomes the urging force of the spring 8 so that the stationary iron core 5 attracts the moving iron core 1 in the direction A. When the moving iron core 1 acts in the direction A, the valve member 3 and the valve seat 4 are separated to open the passage so that the fluid flows from the port 12 via the passage 13 to the port 11. When the supply of the electric power is stopped, the electric coil 6 is deenergized so that no magnetic force is established in the stationary iron core 5. As a result, the moving iron core 1 is moved in the direction opposite to the direction A by the urging force of the spring 8. This movement of the moving iron core 1 is stopped when the valve member 3 and the valve seat 4 abut against each other to close the passage. Linear control can be effected by supplying the power to the electric coil 6 many times for a short time period. Thus, the flow rate from the port 12 to the port 11 can be substantially linearly changed by opening/closing the valve seat 4 and the valve member 3 many times for a short time period.

In this embodiment, the stationary iron core 5 is caused to attract the moving iron core 1 in the direction A by supplying the power to the electric coil 6. In a structure in which the stationary iron core 5 is caused to attract the moving iron core 1 in the direction opposite to the direction A by inverting the power supply to the electric coil 6, the following modification may be made. In this modification, the spring 8 engages with the moving iron core 1 at its one end and with the stationary iron core 5 at its other end so that it urges the moving iron core 1 at all times in the direction to separate the value seat 4 and the valve member 3. In other words, the state in which the valve member 3 and the valve seat 4 are in abutment to close the passage occurs when the electric coil 6 is energized. On the contrary, the state in which the valve member 3 and the valve seat 4 are separate from each other to open the passage occurs when the electric coil 6 is deenergized. In this modification, the leaf spring 2 is arranged to abut against the side, as located in the acting direction of the moving iron core when the electric coil 6 is energized, of the flanged portion 1a. Moreover, the leaf spring may be so fixed in the housing that it has a variation 0 when the electric coil 6 is deenergized and that it warps when the electric coil 6 is energized. The valve member 3 may preferably have the leaf spring 2 and the moving iron core 1 fixed thereto by the holes 2a formed in the leaf spring 2 and the flanged portion 1a formed on the moving iron core 1.

Since the moving iron core is provided in the acting direction with the flanged portion having one face to abut against the leaf spring, according to the invention, the leaf spring does not come out the abutment but is kept at all times in abutment against the active moving iron core. When the moving iron core acts, the leaf spring always warps to exert the urging force upon the outer circumference of the moving iron core. The moving iron core can thereby be prevented while it is acting from any axial deflection to thereby eliminate the noise which might otherwise be caused by the deviation in the abutting position between the valve member and the valve seat.

According to the invention, moreover, no separate member is required for fixing the leaf spring and the moving iron core because the leaf spring and the moving iron core are fixed by the valve member. As a result, the wear which might otherwise occur when the valve member turns into abutment against the valve seat can be prevented by regulating the axial turn of the moving iron core.

According to the invention, even further, the leaf spring and the moving iron core can be easily fixed by inserting the valve member partially into the holes of the leaf spring when the valve member is formed on the moving iron core. At the same time, the portions inserted into the holes can regulate the axial turn of the moving iron core more to prevent more the wear which might otherwise occur when the valve member turns into abutment against the valve seat.

What is claimed is:

1. A solenoid valve comprising a housing having an electric coil and a magnetic core built therein; a valve seat formed in the inside of said housing; a moving iron core adapted to be actuated by said electric coil and said magnetic core and having a valve member for opening/closing said valve seat; and a leaf spring fixed in the inside of said housing and adapted to warp at all times when said moving iron core acts, wherein the improvement comprises a flanged portion extended from said moving iron core in a direction perpendicular to the acting direction of said moving iron core and outward of the same and having one face for causing said leaf spring to abut against the face of said moving iron core in the acting direction when said electric coil is energized, an inner edge of the leaf spring being positioned in contact with the one face of the flange portion of the moving iron core.

2. A solenoid valve according to claim 1, wherein said leaf spring and said flanged portion are fixed by said valve member.

3. A solenoid valve according to claim 2, wherein said flanged portion is formed in the vicinity of said valve member, wherein said leaf spring has holes, and wherein said valve member is made of an elastic member which is inserted into said holes to cover said flanged portion thereby to fix said leaf spring and said flanged portion.

* * * * *

UNITED STATES PATENT AND TRADEMARK OFFICE
CERTIFICATE OF CORRECTION

PATENT NO. : 6,073,908
DATED : June 13, 2000
INVENTOR(S) : Koga et al.

It is certified that error appears in the above-identified patent and that said Letters Patent is hereby corrected as shown below.

On the title page:

Item [73], please delete "Aisen" and insert --Aisin--

Signed and Sealed this

Fifteenth Day of May, 2001

NICHOLAS P. GODICI

*Attest:*

*Attesting Officer*     Acting Director of the United States Patent and Trademark Office